Aug. 14, 1962  R. S. QUESINBERRY  3,049,331
FLUID CONTROL MECHANISM
Filed July 25, 1960  2 Sheets-Sheet 1
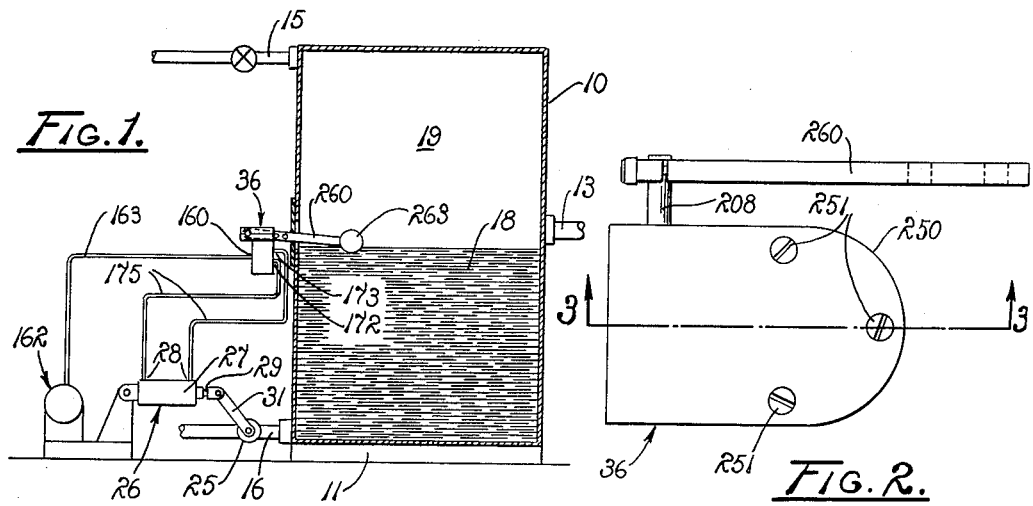
Fig. 1.
Fig. 2.
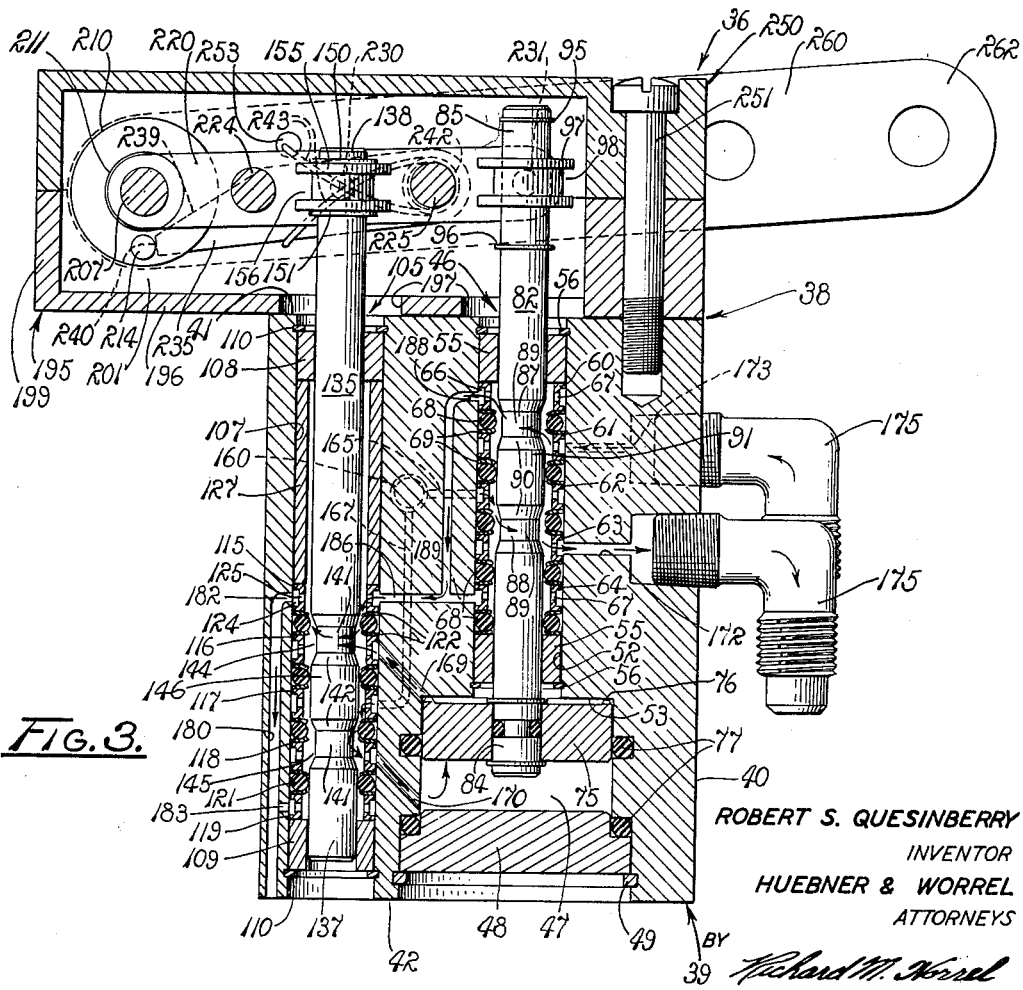
Fig. 3.
ROBERT S. QUESINBERRY
INVENTOR
HUEBNER & WORREL
ATTORNEYS
BY Richard M. Worrel

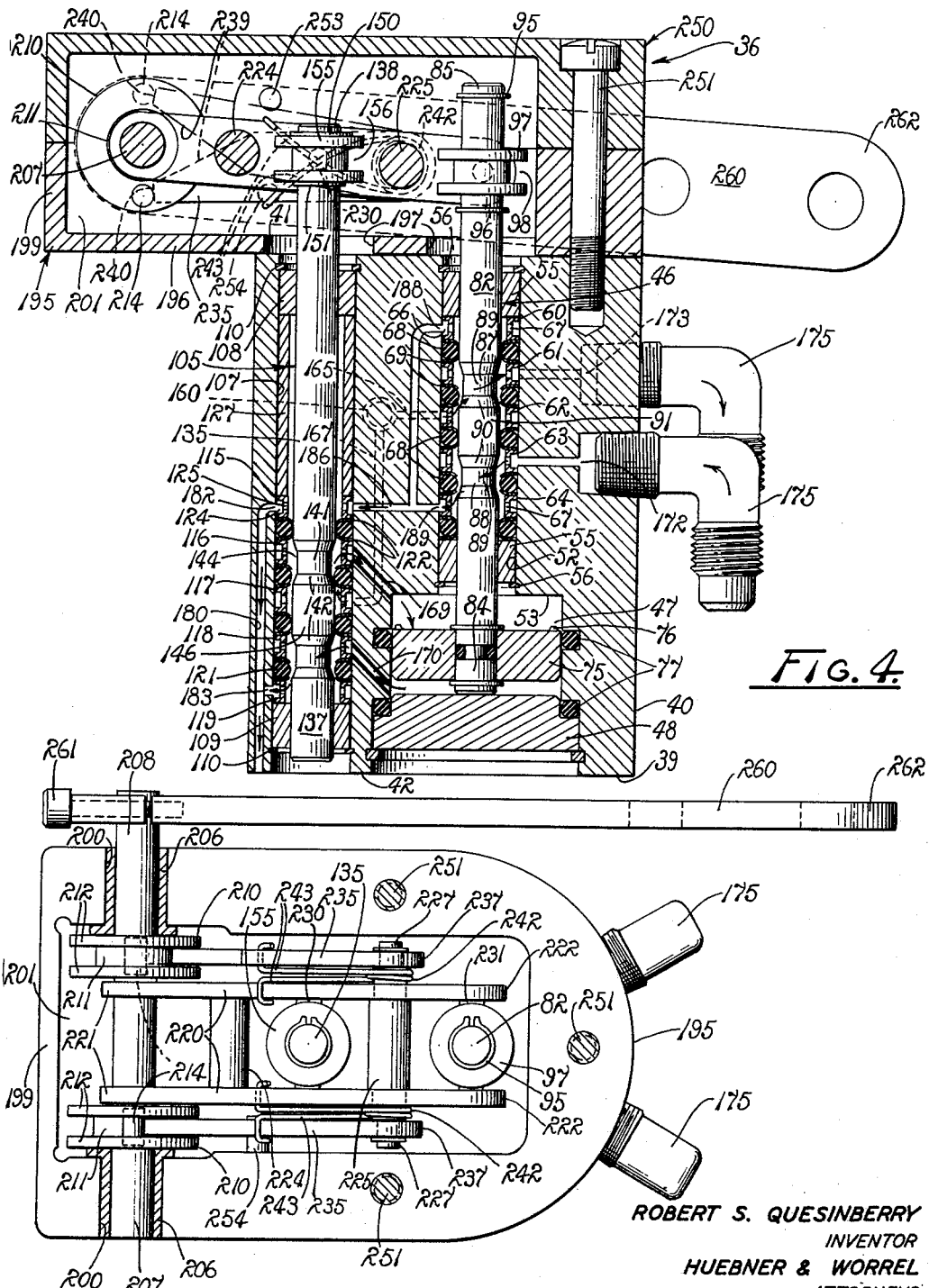

United States Patent Office 3,049,331
Patented Aug. 14, 1962

3,049,331
FLUID CONTROL MECHANISM
Robert S. Quesinberry, Southgate, Calif., assignor to Flow Equipment Company, Santa Fe Springs, Calif., a corporation of California
Filed July 25, 1960, Ser. No. 45,076
9 Claims. (Cl. 251—14)

The present invention relates to a fluid control mechanism and, more particularly, to a snap acting pilot valve.

The valve is preferably utilized in pneumatic systems but also may be employed in hydraulic systems. It is therefore referred to as a fluid control mechanism to encompass both pneumatic and hydraulic suitability.

The valve was designed primarily as a snap acting pilot for the automatic control of high-low liquid levels in various types of vessels but has a wide range of other uses making it excellently suited to automation. Previous pilot valves provided for such purposes have been subject to certain difficulties which the present invention has overcome.

Generally, pilot valves are actuated by floats or other relatively slow moving controlling devices. As a result of the gradual actuation, such pilot valves have had serious problems of operation. They have been insufficiently sensitive to achieve the prompt action desired. They have been incapable of achieving close limit control, as for example in the regulation of the fluid level in a vessel. They have had excessively wide lattitudes of inactive neutral ranges. They have not been self-actuating in the sense that if they start to open or start to close no provision has been made for prompt and automatic full opening or full closing other than by further actuation by the control mechanism. They have been incapable of pressuring both sides of the piston of a ram or the diaphragm of a control mechanism to achieve prompt and decisive control. They have failed to attain dependable fluid, pneumatic or hydraulic, powered opening and closing action. These deficiencies have primarily motivated the present invention.

Further, known valves of the type referred to which have been float actuated have not permitted movement of the floats or other controlling devices beyond limits predetermined by the valves. This factor has been a source of strain on such valves and their associated mechanisms, a cause of inaccurate control, and productive of immersion and suspension of the floats.

Accordingly, it is an object of the present invention to provide a fluid control mechanism or snap acting pilot valve which is self-actuated to fully open or to fully closed position upon being started toward open or toward closed position by an associated controlling device.

Another object is to provide a snap acting pilot valve which has improved sensitivity to controlling impulses.

Another object is to provide a pilot valve capable of achieving close limit control, as for example in the regulation of fluid level in a vessel.

Another object is to provide a pilot valve capable of pressuring both sides of a ram, diaphragm, or the like.

Another object is to provide a pilot valve having controlled connection to a movable controlling device which permits the device to move out of a predetermined controlling range without structural or functional impairment of the valve.

Another object is accurately to control the level of liquid in a tank within a predetermined minimum range.

Another object is to provide a fluid controlled mechanism wherein a main valve is reciprocated by fluid pressure directed to the main valve incident to movement of a controlling member but wherein the main valve is directly moved by the controlling member if such fluid pressure fails to move said main valve.

Other objects are to provide a fluid control mechanism of the type described which is compact, dependable in operation, economical, and which has applications other than those specifically set forth herein.

These, together with other objects, will become more fully apparent upon reference to the following description and the accompanying drawings.

In the drawings:

FIG. 1 is a vertical section of a tank containing a liquid, a liquid level control valve connected in the outlet of the tank, and a fluid control mechanism embodying the principles of the present invention and connecting a float in the tank to the liquid level control valve so as to control the latter incident to rise and fall of the float.

FIG. 2 is a somewhat enlarged top plan view of the fluid control mechanism.

FIG. 3 is a vertical section taken on line 3—3 of FIG. 2 showing the mechanism in one of its positions of operation.

FIG. 4 is a view similar to FIG. 3 but showing the mechanism in another position of operation.

FIG. 5 is a top plan view of the flow control mechanism of FIG. 2 with a cover thereof removed and portions shown in horizontal section for illustrative convenience.

Referring more particularly to the drawings, a tank 10 is mounted on a base 11 and has a fluid inlet 13, and upper and lower fluid outlets 15 and 16, respectively. The tank is adapted to receive intermingled oil and gas through the inlet wherein they separate by gravity into lower and upper phases, respectively, as indicated at 18 and 19. The oil and gas within the tank are released therefrom through the lower and upper outlets, respectively.

A liquid level control valve 25 is connected to the lower outlet 16 and constitutes a driven or controlled member. A pneumatic ram 26 is supported on the base 11 and includes a cylinder 27 having a pair of fluid ports 28, and an elongated piston rod 29. A linkage 31 interconnects the piston rod and the liquid level control valve so that the latter valve is opened and closed in response to reciprocation of the piston rod.

Although the invention is not to be so limited, the foregoing serves as a convenient environment for describing the fluid control mechanism, generally indicated by the numeral 36, of the present invention. This mechanism is preferably mounted on the tank 10 and includes a body 38, best illustrated in FIGS. 3, 4, and 5, having a lower portion 39 defined by a cylindrical side wall 40, and flat top and bottom walls 41 and 42.

A main control valve is generally indicated by the numeral 46, and is in fluid communication with an elongated cylindrical valve chamber 47 of predetermined maximum diameter and endwardly opening through the bottom wall 42. A cylindrical end cap 48 is fitted in and closes the end of the chamber. A retaining ring 49 is fitted in a groove of the body against the cap for releasably retaining the same in the described position. The main control valve includes an elongated, cylindrical main bore 52 diametrically smaller than, and coaxially upwardly extended from, the chamber and in communication therewith. The body 38 has a radial shoulder 53 constituting the inner wall of the chamber. Upper and lower, annular bearings 55 are fitted in the bore in axially spaced relation and are held against endward movement outwardly of the main bore by retaining rings 56.

A plurality of porting collars 60, 61, 62, 63, and 64 are concentrically fitted in the main bore 52 between the bearings 55 with adjacent collars being in axially spaced relation to each other. Each collar defines an annular recess 66 with the wall of the bore and also has a port 67 providing communication between the bore and the recess. O-rings 68 are concentrically fitted in the bore individually between adjacent collars, and these O-rings are held in the described positions by washers 69 interposed the O-rings and their respectively adjacent collars. It is to be observed, however, that the O-rings have a uniform inside diameter which is slightly less than the uniform inside diameter of the collars, all for a purpose to be described.

An auxiliary piston 75 is axially slidably fitted in the chamber 47 for upward and downward reciprocal movement therein. The piston has upper lugs 76 engageable with the shoulder 53 to insure provision of minimum spacing between the piston and the shoulder in the upper position of the piston. Fluid sealing O-rings 77 circumscribe the piston as well as the end cap 48 and engage the body 38. The chamber 47 and piston 75 constitute an auxiliary ram for controlling movement of the main valve.

An elongated cylindrical main piston rod 82 has a lower end portion 84 concentrically secured to the piston 75 and endwardly downwardly extended therefrom for abutment with the end cap 48 to provide minimum spacing between the piston and the cap in the lower position of the piston. The piston rod is concentrically axially slidably positioned in the bore 52 by the bearings 55, and extends upwardly through the O-rings 68, and the ported collars 60, 61, 62, 63, and 64. The piston rod has an upper end portion 85 extended upwardly out of the lower portion 39 of the body 38.

The main piston rod 82 also provides upper and lower, annular, valving grooves 87 and 88 which are defined by diametrically reduced portions 89 and endwardly divergent, frusto-conical, upper and lower seating portions 90, and which are separated by an intermediate portion 91. The diameter of the reduced portions is less than the inside diameter of the O-ring 68 so that when the O-rings are in radially opposed, circumscribing relation to the grooves, the O-rings are circumferentially spaced from the reduced portions. However, the O-rings are in fluid-tight constriction about the lower, upper, and intermediate portions 84, 85 and 91 when in circumscribing relation thereto.

It will be noted that sealing surfaces within the bore 52 will be provided by the O-rings in conjunction with the lower, upper, and intermediate portions of the main rod 82. By the use of the ported collars interposed the O-rings, a plurality of sealing surfaces can be selectively axially disposed along the bore 52 which minimizes the total area of sealing surface and results in a pilot-operated valve having a minimum resistance to movement and a maximum sensitivity.

Upper and lower stops 95 and 96 are secured to the upper end portion 85 of the main piston rod 82 in axially spaced relation therealong. Further, an annular, main crosshead 97 is axially slidably fitted on the piston rod between the stops to form a lost motion connection between the main piston rod and crosshead. The crosshead has an annular channel 98 therein.

The subject mechanism also includes a triggering valve 105 including an elongated auxiliary bore 107 in axially spaced parallel relation to the main bore 52 and opening through the top and bottom walls 41 and 42. Upper and lower bearings 108 and 109 are fitted in the auxiliary bore in axially spaced relation and adjacent to the top and bottom walls. These bearings are held in the described positions by retaining rings 110. In a manner similar to the main valve 46, porting collars 115, 116, 117, 118, and 119 are concentrically positioned in the auxiliary bore 107 in alternate arrangement with a plurality of O-rings 121 held in positions by washers 122. Each of the collars provides an annular recess 124 and has a port 125 establishing communication between the auxiliary bore and its respective recess. An elongated spacing sleeve 127 is concentrically fitted in the auxiliary bore between the upper bearing 108 and the upper porting collar 115. The inside diameter of the O-rings 121 is less than the inside diameter of the porting collars, as previously described in connection with the main valve 46.

A cylindrical triggering valve rod 135 is concentrically, axially slidably mounted in the auxiliary bore 107 in the upper and lower bearings 108 and 109. The triggering rod has a lower end portion 137 and an upper end portion 138, the latter being upwardly extended from the top wall 41. The triggering rod has diametrically reduced portions 141 and frusto-conical seats 142 defining upper and lower valving grooves 144 and 145, respectively, and an intermediate rod portion 146. The reduced portions 141 are diametrically smaller than the inside diameter of the O-rings 121, in a manner similar to that described for the main valve 46.

The O-rings 68 are preferably of Buna-N while the valve rods 82 and 135 and the piston 75 are preferably coated with Teflon to minimize frictional resistance and yet to provide effective fluid seals.

Upper and lower stops 150 and 151 are secured to the upper end portion 138 of the rod 135 in axially spaced relation thereon. An annular, triggering crosshead 155 is fitted on the upper end portion of the rod 135 between the stops 150 and 151 and provides an annular channel 156. The stops preclude axial slidable movement of the crosshead on the triggering rod.

The body 38 provides an air inlet port 160 connected to an air supply pump 162 by a supply hose 163. The body also provides a ram feeding passage 165 connected to the inlet port and opening into the main bore 52 in the recess 66 about the porting collar 62. The body has a chamber feeding passage 167 connected to the inlet port and opening into the auxiliary bore 107 through the recess 124 around the porting collar 117. Additionally, the body provides a pair of chamber ducts 169 and 170 respectively interconnecting the upper end of the chamber 47 and the recess 124 around the porting collar 116 and the lower end of the chamber and the recess 124 around the porting collar 118. Further describing the body, there are provided a pair of ram ducts 172 and 173 respectively leading from the recesses 66 around the porting collars 61 and 63 outwardly through the side wall 40 of the body. Ram conduits 175 individually interconnect these ram ducts and the ports 28 of the ram cylinder 27.

The lower portion 39 of the body 38 provides an exhaust passage 180 opening through the bottom wall 42 and extended upwardly along side of the auxiliary bore 107. Upper and lower exhaust ports 182 and 183 interconnect the exhaust passage and the recesses 124 around the uppermost and lowermost porting collars 115 and 119. Additionally, the body has a main return passage 186 connected to the auxiliary bore through the recess 124 around the upper porting collar 115 and also connected to the recesses 66 around the porting collars 60 and 64 through upper and lower ports 188 and 189, respectively.

The body 38 also has an upper portion 195 having a bottom wall 196 against the top wall 41 of the lower portion 39 and providing openings 197 individually registering with the main and auxiliary bores 52 and 107 so as to receive the valve rods 82 and 135 therethrough. The upper body portion also includes a rectangular side wall 199 upwardly extended from the bottom wall and having upwardly disposed bearing notches 200 in axial alignment transversely of the upper portion. The upper portion thus defines an open compartment 201 into which the rods 82 and 135 and crossheads 97 and 155 extend.

Bearings 206 are individually releasably rested in the notches 200 and rotatably journal a rock shaft 207 therein, the latter having an endwardly extended portion 208. Upper and lower limiting, ratchet wheels 210 are secured to the shaft inwardly of the bearings and in axially spaced relation to each other. Each wheel has a hub 211 and a pair of circular, axially spaced discs 212 radially extended from the hub. Upper and lower teeth 214 are extended between adjacent discs in radially outwardly spaced relation to the axis of the wheels. As best seen in FIG. 4, and as indicated in FIG. 5, the two teeth are displaced approximately 180° from each other with respect to the shaft so that when one of the teeth is in an upwardly disposed position, the other tooth is in a downwardly disposed position, and vice versa.

A pair of elongated arms 220 provide inner end portions 221 pivotally supported on the rock shaft 207 inwardly of the ratchet wheels 210. The arms have outer end portions 222 and are held in spaced relation axially of the rock shaft by inner and outer crossbars 224 and 225, the latter having outwardly projected ends 227. The arms are spaced apart by the bars by a distance slightly greater than the outside maximum diameter of the crossheads 97 and 155 and are on opposite sides of said crossheads, as illustrated in FIG. 5. The triggering crosshead is located between the bars while the main crosshead is located outwardly of the outer bar. Inner and outer, axially aligned pairs of trunnions 230 and 231 are inwardly extended from the arms 220 and are respectively received in the channels 156 and 98. It is to be observed that when the arms are elevationally pivoted on the rock shaft 207, the triggering rod 135 is elevationally reciprocated in the auxiliary bore 107 while, within the limits of the stops 95 and 96, the main crosshead 97 is slid upwardly and downwardly on the main piston rod 82 during said elevational movement of the arms. If the arms are pivoted upwardly or downwardly far enough, the main crosshead engages the stops to lift or lower the main piston rod.

Elongated, upper and lower limiting pawls 235 provide mounted ends 237 rotatably received on the extended ends 227 of the outer bar 225. The pawls are individually in vertical planes respectively passing between the discs 212 of the ratchet wheels 210 on their respective sides of the arms 220. As best seen in FIGS. 3 and 4, the upper and lower pawls have upwardly and downwardly disposed inner beveled edges 239, respectively, and inner abutment ends 240. Pawl springs 242 have coiled portions around the ends 227 of the outer bar 225 between the arms 220 and the pawls 235. Each spring also has a pair of legs 243 providing hooked ends respectively connected to the arm and pawl adjacent thereto, as best seen in FIG. 5, for urging the beveled edges of the pawls against the hubs 211 of the ratchet wheels 210. In the position of the rock shaft 207 shown in FIGS. 3, 4, and 5, with the teeth 214 upwardly and downwardly disposed, the pawl springs hold the abutment ends of the pawls against the teeth of their respectively adjacent wheels. Therefore, with the beveled edges urged against the hubs and the ends 240 abutting the teeth, the arms 220 are substantially rigidly held in a diametric plane passing through the shaft 207 and equidistantly between the teeth, as illustrated in FIG. 4. Thus, the arms move upwardly and downwardly incident to abutment of the teeth with their respective pawls during rocking of the shaft.

The body 38 also includes a cover 250 complementarily fitted over the upper portion 195 and enclosing the structure disposed within the compartment 201 and supported by the upper portion. Elongated screws 251 extend through and releasably retain the cover, the upper portion, and the lower portion 39 in assembled relation. Upper and lower, pawl engaging, stop pins 253 and 254 are respectively inwardly extended from the side wall 199 of the upper body portion and from the cover into the compartment 201 transversely of and respectively above and below the upper and lower limiting pawls 235. The pawls are engageable with their respective stop pins incident to the above described elevational movement of the pawls upon rotation of the rock shaft 207. When either one of the pawls engages its respective stop pin, further elevational movement of such pawl is precluded whereby continued rotation of the rock shaft in the same direction urges the tooth 214 of the corresponding ratchet wheel 210 under the abutment end 240 of such pawl and into slidable engagement with its respective beveled edge 239. Thus, while the ratchet wheels and pawls elevationally move the arms through a predetermined angle, dependent upon the spacing between the pawls and their respective stop pins, the ratchet mechanism releases the arms from the shaft for respective independent movement outside of this angular limit.

With reference to FIGS. 1 and 2, an elongated lever 260 is adjustably connected to the extended portion 208 of the rock shaft 207 by means of a setscrew 261. The lever has an outer end 262 which is extended into the tank 10 and connected to a float 263 buoyed on the oil 18, or other liquid, in the tank.

*Operation*

The operation of the described embodiment of the subject invention is briefly summarized at this point. In describing the operation of the subject fluid control mechanism 36, reference is conveniently made to its use as a pilot for a separator, including the tank 10, and which separates intermingled oil and gas flowing out of an oil well into the inlet 13. It is to be understood, however, that this mechanism has utility in other environments.

The present mechanism 36 maintains the level of the oil 18 in the tank 10 at approximately a predetermined height or, stated otherwise, controls the maximum and minimum levels of the oil.

Assuming that the liquid level control valve 25 is open and that the subject mechanism 36 is in the condition illustrated in FIG. 3, the system is conditioned to drain oil from the tank 10. As the level of the oil 18 drops, the lever 260 moves downwardly rotating the shaft 207 in a clockwise direction, as viewed in FIGS. 3 and 4. The ratchet wheels 210 are similarly rotated whereby the upper tooth 214 is urged against the abutment end 240 of the upper pawl 235, as indicated in FIG. 4. This applies downward force on the outer end portions 222 of the arms 220, and, in effect, connects the arms to the shaft 207 for downward movement therewith.

With reference to FIGS. 3 and 4, the triggering valve rod 135 is thus moved downwardly by the arms 220 and their connection to the triggering crosshead 155. The upper portion 135 of the triggering rod engages the uppermost O-ring 121 and the intermediate portion 146 engages the next-ot-the-lowest O-ring whereby fluid passage through the triggering valve is momentarily interrupted. Further downward movement of the triggering rod causes the upper groove 144 to bridge the next-to-the-uppermost O-ring and the lower groove 145 to bridge the lowermost O-ring whereby air pressure is applied over the piston 75 through the upper chamber duct 169 while air pressure is bled through the lower chamber duct 170 to the atmosphere.

When sufficient pressure exists in the chamber 47 above the piston 75 to overcome the frictional resistance to movement of the main valve rod 82 and the piston, the valve rod and piston move downwardly until the lower end portion 84 of the piston rod engages the end cap 48. It is to be noted that there is a minimum resistance to axial movement of the main piston rod and piston, and that this resistance is predetermined and substantially uniform. Thus, it is known in advance what pressure is required to overcome this frictional resistance to movement so that, considering the size of the piston, the correct air pressure is admitted to the chamber immediately upon the described bridging of the O-rings by the grooves. Movement of the main piston rod and piston downwardly, or upwardly, is rapid and in the nature of a snap action and is thus commercially referred to as a snap acting pilot.

With continued reference to FIG. 4, with the main valve rod 82 in its lower position, the upper groove 87 bridges the next-to-the-uppermost O-ring 68 to establish communication between the ram feeding passage 165 and the ram duct 173. The lower groove 88 establishes communication between the lower return port 189 and the ram duct 172 by bridging the next-to-the-lowermost O-ring 68. It is to be observed that the triggering valve 105 always maintains fluid communication between the exhaust passage 180 and the main return passage 186 when in either of its opposite valving positions. Therefore, air or hydraulic fluid under pressure is fed to the ram duct 173 and bled from the ram duct 172.

Because of the reversal of the air pressure and exhaust in the ducts 172 and 173, the ram 26 is actuated to move the liquid level control valve 25 into closed position thereby precluding further flow of oil 18 out of the tank 10. Assuming continued inflow of oil through the inlet 13, closure of the liquid level control valve prevents the level of the oil from dropping below a predetermined height.

It is believed evident that if the level of the oil 18 rises sufficiently, the lever 260 also rises to lift the triggering valve rod 135 and to reverse the connections to the auxiliary ram chamber 47 thereby to lift the main valve rod 82 into the position of FIG. 3. This reverses the connections to the ducts 172 and 173 whereby the liquid level control valve is opened to release oil from the tank. Repetition of this operation maintains the level of the oil within predetermined upper and lower limits. Although the subject mechanism preferably employs a source 162 of pneumatic pressure, it can utilize hydraulic pressure if desired.

Assuming that the subject fluid control mechanism has opened the liquid level control valve 25 incident to rise in the level of the oil 18, and assuming oil continues to flow into the tank 10 at a higher rate than it flows out of the outlet 16, the float 263 and lever 260 continue to rise. With reference to FIG. 3, when the lower pawl 235 engages the upper pin 253, said pawl is precluded from further upward movement. Therefore, continued counterclockwise rotation of the shaft 207, as viewed in FIG. 3, urges the lower tooth 214 onto the beveled edge 239 of the lower pawl whereupon the arms 220 are no longer moved upwardly by the ratchet mechanism. Thus, the float, the lever, the shaft, and the ratchet wheels 210 move independently of the valve rod 135 outside of the predetermined limits within which it is desired to control the level of the oil 18. The ratchet mechanism disconnects the arms 220 from the shaft when the lever moves downwardly far enough to bring the upper pawl into engagement with the lower stop pin 254. When the lever is moved back into the angular range of control, the teeth slide over their respective beveled edges 239 and eventually into abutment with the ends 240. Of course, the springs 242 assist in this action by continually urging the pawls against the hubs 211 of the ratchet wheels 210.

Another feature of the subject mechanism is to be noted. If, during either upward or downward movement of the lever 260, fluid pressure ducted to the chamber 47, by movement of the triggering valve between its positions of operation, fails either to lift or to lower the main valve rod 82, continued upward or downward movement of the lever and the arms 220 brings the main crosshead 97 into engagement with either the upper or lower stops 95 or 96 whereby the main valve rod is directly lifted or lowered by the arms.

From the foregoing it will be evident that a fluid control mechanism has been provided which completely opens or completely closes a valve in a rapid manner incident to even the slow movement of a float, or other slow acting member, between predetermined limits. In addition, the mechanism allows the float, or other controlling device, to move outside of the predetermined limits of control independently of the valve or other device controlled. The subject mechanism controls level of liquid in a tank accurately within a predetermined minimum range. It is compact, durable, and dependable in operation.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A pneumatic, snap acting pilot mechanism comprising a valve body providing elongated, spaced, substantially parallel, main and auxiliary bores, a chamber coaxially extended from the main bore, an inlet port adapted for connection to a source of fluid under pressure, main and auxiliary feeding passages interconnecting said inlet and said main and auxiliary bores, respectively, an exhaust passage open to the atmosphere having a pair of exhaust ports connected to the auxiliary bore, a return passage connected to the auxiliary bore and having a pair of return ports connected to the main bore, a pair of chamber ducts connected to the chamber in axially spaced relation therein and being also connected to the auxiliary bore in axially spaced relation therealong, and a pair of control ducts connected to the main bore; an elongated main valve rod slidably fitted in the main bore for axial reciprocal movement between first and second positions alternately and oppositely connecting the main feeding and return passages to the control ducts; a piston connected to the main valve rod and slidably fitted in the chamber for axial reciprocal movement therein; an elongated triggering valve rod fitted in the auxiliary bore for axial reciprocal movement between first and second positions alternately and oppositely connecting the main feeding and exhaust passages to the chamber ducts for imparting reciprocal movement to the piston thereby to reciprocate the main valve rod between its first and second positions, said triggering valve rod providing communication between the return and exhaust passages in both of said first and second positions of the triggering rod; a rock shaft; means mounting the shaft on the body in laterally spaced relation to the valve rods and for rotation about an axis disposed transversely thereof; elongated arm means journaled on the shaft and extended in juxtaposition to the rods for elevational movement about said axis; means connecting the triggering rod to the arm means for reciprocation between its first and second positions in response to said elevational movement; means slidably coupling the arm means to the main rod; upper and lower stops connected to the main rod above and below said coupling means and engageable therewith incident to predetermined elevational movement of the arm means to raise or to lower the main valve rod, said triggering rod being moved into its first or second positions in advance of engagement of the coupling means with either of said stops; and ratchet means interconnecting the shaft and the arm means for elevationally moving the arm means incident to rotation of the shaft through a predetermined angle only.

2. The mechanism of claim 1 wherein said ratchet means includes ratchet wheels secured to the shaft, one of the wheels having an upper tooth and the other wheel having a lower tooth, said teeth being circumferentially displaced relative to each other on their respective wheels; elongated upper and lower pawls pivotally connected to the arm means in individual alignment with the wheels for rotation about axes in spaced parallel relation to the shaft; resilient means interconnecting the arm means and the pawls yieldably urging the pawls against the wheels and individually into abutment with the teeth on their respective wheels.

3. The mechanism of claim 1 wherein said coupling means is a collar slidably received on the main rod and having an annular channel; wherein said arm means includes a pair of arms on opposite sides of the collar;

and including trunnions inwardly extended from the arms and relatively rotatably received in the channel of the collar.

4. The mechanism of claim 3 wherein upper and lower stops are secured to the main rod above and below the collar for engagement thereby directly to lift or to lower the main rod in the event that said main rod has not been urged into position by the triggering valve rod and said piston.

5. In a fluid controlled apparatus providing a pair of ports and being movable into one of two positions incident to the admission of predetermined fluid pressure to one of the ports, while the other port is open, and vice versa, and a source of fluid adapted to deliver said predetermined fluid pressure; a snap acting, fluid pilot mechanism for alternately connecting said source to the ports so that one port is open while the other port admits said predetermined fluid pressure, and vice versa, comprising a main valve including a piston rod movable against a predetermined frictional resistance between first and second positions alternately and oppositely connecting the ports to the source of fluid and to the atmosphere; a reciprocable ram having fluid admitting and releasing ports, said ram being connected to the main valve for moving the main valve between its first and second positions incident to admission and release of fluid alternately to and from said ram ports, said fluid being under sufficient pressure to overcome said predetermined frictional resistance; a triggering valve movable between first and second positions establishing fluid communication alternately and oppositely between the ram ports and said source for reciprocating the ram thereby to move the piston rod between its positions; controlling means connected to the triggering valve for moving it between its first and second positions wherein each of said valves provides an elongated bore; a plurality of porting collars of uniform inside diameter fitted in the bore and axially spaced therealong, each collar providing an annular recess and a port opening into the bore, the recesses of the collars of the main and triggering valves being selectively connected to the ducts, to said source, to the atmosphere, and to the ram ports; resiliently compressible O-rings fitted in the bores individually between the collars and having inside diameters less than those of the collars; and an elongated rod axially slidably mounted in the bore and having upper, lower and intermediate portions of maximum diameter engaging the O-rings in fluid-tight relation and being separated by a pair of annular valving grooves defining diametrically reduced portions of smaller diameter than the O-rings, said rod being reciprocably movable between said first and second positions of its respective valve with the grooves in the respective rods bridging the O-rings and establishing fluid communication between the collar ports of adjacent collars to effect said connections in said first and second positions.

6. The mechanism of claim 5 wherein the O-rings are Buna-N and the valve rods are coated with Teflon.

7. A fluid control mechanism comprising a support; a main valve mounted in the support and movable between first and second flow control positions; an auxiliary reciprocable ram borne by the support having fluid ports and being connected to the main valve for moving the main valve between its first and second positions upon alternately and oppositely admitting and releasing fluid to and from the auxiliary ram ports; a triggering valve mounted in the support movable between first and second positions alternately and oppositely establishing fluid communication between the auxiliary ram ports and a source of fluid pressure and a sump whereby said main valve is moved between its first and second positions; actuating means carried by the support to move said triggering valve to and from said first and second positions; interconnecting means joining the triggering valve with said actuating means to permit movement of said triggering valve during a predetermined range of movement of said actuating means; and means connecting said actuating means and said main valve to permit movement of said main valve by said actuating means only upon exceeding said predetermined range of movement.

8. The flow control mechanism of claim 7 wherein said main and triggering valves include spaced substantially parallel main and triggering valve rods having a limited range of movement; wherein said actuating means includes a rock shaft journaled in the support, a lever rigidly connected with the shaft for rotation thereof in opposite directions incident to reciprocation of the lever, a pair of arms journaled on the shaft for elevational adjustment and outwardly extended on opposite sides of the valve rods, means pivotally connecting the triggering rod to the arms for elevational movement therewith, means axially slidably and pivotally connecting the arms to the main rod, and ratchet means borne by the shaft and the arms releasably interconnecting the shaft and the arms for elevationally moving the arms incident to rocking of the shaft through a predetermined angle and including means mounted on the support and engaging the ratchet means at the limits of the angular movement of the shaft to release the ratchet means and thereby to release the lever for movement beyond said limited range of movement.

9. The mechanism of claim 8 wherein the ratchet means includes upper and lower limit wheels including hubs concentrically secured to the shaft individually outwardly of the arms, axially spaced discs radially outwardly extended from the hubs, and lower and upper teeth extended between the discs of the upper and lower limit wheels, respectively, the teeth being in substantially one-hundred and eighty degree spaced relation about the shaft, upper and lower limit pawls individually pivotally connected to the arms in radially spaced relation to the shaft and individually extended between the discs of the wheels adjacent to their respective arms and respectively below and above the hubs of such wheels, springs interconnecting the adjacent arms and pawls yieldably urging the pawls against their respective hubs and into abutment with the adjacent teeth upon rotation of the shaft within said predetermined angle; and wherein said releasing means includes upper and lower stop pins mounted on the support above and below the upper and lower limit pawls, respectively, and in the paths of movement thereof for engagement with their respective pawls to preclude further upward or downward movement of the pawls beyond the limits of said predetermined angular rotation of the shaft whereby the teeth slide under their respective pawls to release the shaft from the valve rods.

References Cited in the file of this patent

UNITED STATES PATENTS

| | | |
|---|---|---|
| 352,387 | Banks | Nov. 9, 1886 |
| 1,580,499 | Kruttschnitt | Apr. 13, 1926 |
| 2,226,533 | Krieg et al. | Dec. 31, 1940 |
| 2,633,865 | Mastnock | Apr. 7, 1953 |
| 2,668,556 | Meyer | Feb. 9, 1954 |
| 2,867,233 | Adelson | Jan. 6, 1959 |
| 2,892,644 | Collins | June 30, 1959 |
| 2,919,590 | Griswold | Jan. 5, 1960 |
| 2,936,995 | Girardin | May 17, 1960 |
| 2,944,562 | Glasgow et al. | July 12, 1960 |

FOREIGN PATENTS

| | | |
|---|---|---|
| 1,196,890 | France | June 1, 1959 |